United States Patent
Dyson et al.

(10) Patent No.: US 11,225,707 B2
(45) Date of Patent: Jan. 18, 2022

(54) PROTECTIVE SHIELDS FOR IMPROVED COATING OF TURBINE COMPONENT COOLING FEATURES

(71) Applicant: General Electric Company, Schenectady, NY (US)

(72) Inventors: Thomas Earl Dyson, Niskayuna, NY (US); Lyndsay Marie Kibler, Cincinnati, OH (US); Brendon James Leary, Simpsonville, SC (US); David Vincent Bucci, Greenville, SC (US)

(73) Assignee: General Electric Company, Schenectady, NY (US)

( * ) Notice: Subject to any disclaimer, the term of this patent is extended or adjusted under 35 U.S.C. 154(b) by 149 days.

(21) Appl. No.: 16/539,803

(22) Filed: Aug. 13, 2019

(65) Prior Publication Data
US 2021/0047718 A1  Feb. 18, 2021

(51) Int. Cl.
*C23C 4/01* (2016.01)
*B33Y 10/00* (2015.01)
(Continued)

(52) U.S. Cl.
CPC ............ *C23C 4/01* (2016.01); *B23P 15/02* (2013.01); *B23P 15/04* (2013.01); *B33Y 10/00* (2014.12);
(Continued)

(58) Field of Classification Search
CPC . C23C 4/01; B23P 15/02; B23P 15/04; B33Y 10/00; B33Y 80/00; B33Y 40/20;
(Continued)

(56) References Cited

U.S. PATENT DOCUMENTS 6,234,755 B1  5/2001  Bunker et al.
6,383,602 B1  5/2002  Fric et al.
(Continued)

FOREIGN PATENT DOCUMENTS

| EP | 0253754 A1 | 1/1988 |
| EP | 1835045 A1 | 9/2007 |
| EP | 2662469 A2 | 11/2013 |

OTHER PUBLICATIONS

Baheri et al., "Film Cooling Effectiveness from Trenched Shaped and Compound Holes", Heat and Mass Transfer, vol. 44, Issue: 08, pp. 989-998, Jun. 2008.
(Continued)

*Primary Examiner* — Moshe Wilensky
(74) *Attorney, Agent, or Firm* — McNees Wallace & Nurick LLC

(57) ABSTRACT

A method of depositing a coating on a component of a turbine engine. The method includes forming a turbine component including at least one cooling flow passage in fluid communication with an aperture on a surface of the turbine component. A protective shield is formed on an inner surface of the at least one cooling flow passage and extending to an exterior of the turbine component via the aperture. During a coating process, the protective shield is configured to block the coating from being deposited in the at least one cooling flow passage via the aperture. Subsequent to coating, at least a portion of the protective shield is removed to provide for passage of a cooling fluid flow in the at least one cooling flow passage. The cooling fluid flow exits the turbine component through the aperture. A turbine component employing user of the protective shield is also disclosed.

14 Claims, 7 Drawing Sheets

(51) Int. Cl.
    *B33Y 80/00*     (2015.01)
    *F01D 5/18*     (2006.01)
    *F01D 5/28*     (2006.01)
    *B23P 15/02*     (2006.01)
    *B23P 15/04*     (2006.01)

(52) U.S. Cl.
    CPC .............. *B33Y 80/00* (2014.12); *F01D 5/186* (2013.01); *F01D 5/288* (2013.01); *F05D 2220/30* (2013.01); *F05D 2230/90* (2013.01); *F05D 2240/24* (2013.01); *F05D 2260/202* (2013.01)

(58) Field of Classification Search
    CPC ...... F01D 5/186; F01D 5/288; F05D 2230/31; F05D 2230/90; F05D 2240/11; F05D 2240/24; F05D 2260/202; F05D 2300/611
    See application file for complete search history.

(56) References Cited

U.S. PATENT DOCUMENTS

| | | |
|---|---|---|
| 9,145,773 B2 | 9/2015 | Bergholz, Jr. et al. |
| 9,181,819 B2 | 11/2015 | Lee et al. |
| 10,010,937 B2 | 7/2018 | Bunker |
| 2012/0052200 A1 | 3/2012 | Zimmerman |
| 2014/0150455 A1 | 6/2014 | Roberts, Jr. et al. |
| 2016/0008889 A1 | 1/2016 | Xu |
| 2016/0090843 A1 | 3/2016 | Albert et al. |
| 2017/0101539 A1 | 4/2017 | Pan et al. |
| 2017/0101870 A1 | 4/2017 | Lewis et al. |
| 2017/0129014 A1 | 5/2017 | Bunker |
| 2017/0234138 A1 | 8/2017 | Bunker |
| 2017/0297054 A1 | 10/2017 | Torigoe et al. |
| 2018/0010484 A1 | 1/2018 | Reed et al. |

OTHER PUBLICATIONS

International Search Report issued to counterpart Application No. PCT/US2020/045585 dated Nov. 10, 2020 with accompanying Written Opinion of the International Searching Authority dated Feb. 18, 2021.

PROTECTIVE SHIELDS FOR IMPROVED COATING OF TURBINE COMPONENT COOLING FEATURES

BACKGROUND

The present invention is directed toward a turbine component coating process and a turbine component. More specifically, the present invention is directed to a turbine component coating process including the use of protective shields, and a turbine component including the application of a coating employing the protective shields.

BACKGROUND OF THE INVENTION

Turbine components are often run at high temperatures to provide maximum operating efficiency. However, the temperature at which a turbine can run may be limited by the temperature capabilities of the individual turbine components. In order to increase the temperature capabilities of turbine components, various methods have been developed. One method for increasing the temperature capabilities of a turbine component includes the incorporation of internal cooling holes, through which cool air is forced during turbine engine operation. As cooling air is fed from the cooler side of the component wall through a cooling hole outlet on the hot side, the rushing air assists in lowering the temperature of the hot metal surface.

Another technique for increasing the temperature capabilities of a turbine component includes the application of coatings, such as a bond coat and a thermal barrier coating (TBC). Often, turbine components include both cooling holes and various coatings applied over the surface of the component. Typically, when cooling holes are formed or modified (e.g., repaired) in the component prior to the (re)application of the coatings, the cooling holes are either masked before coating or the coating is removed from the cooling holes after application. More particularly, conventional methods provide for cooling holes to be drilled in bare metal and then coated with TBC. In many instances, these holes suffer from poor performance caused by the partial filling with TBC and changes to the desired shape of the hole. Additionally, variation in the application of the TBC to the holes can cause unpredictable performance. Alternatively, the coating may be applied first, and then cooling holes are drilled. However, this may require an additional manufacturing step to remove the coating so that holes can be formed. The resulting part may then lack some TBC protection in important regions, such as the trailing edge.

Accordingly, a turbine component coating process with improvements would be desirable in the art.

BRIEF DESCRIPTION OF THE INVENTION

Aspects and advantages of the disclosure are set forth below in the following description, or may be obvious from the description, or may be learned through practice of the disclosure.

In accordance with one embodiment, a method of depositing a coating on a component of a turbine engine is disclosed. The method includes forming a turbine component including at least one cooling flow passage in fluid communication with an aperture on a surface of the turbine component, forming a protective shield on an inner surface of the at least one cooling flow passage and extending to an exterior of the turbine component via the aperture, depositing a coating on an exterior surface of the turbine component, wherein the protective shield is configured to block the coating from being deposited in the at least one cooling flow passage via the aperture. Finally, at least a portion of the protective shield is removed to provide for passage of a cooling fluid flow in the at least one cooling flow passage and wherein the cooling fluid flow exits the turbine component through the aperture.

In another embodiment, method of depositing a coating on a component of a turbine engine is disclosed. The method includes forming via an additive manufacturing process a turbine component including at least one cooling flow passage in fluid communication with an aperture on a surface of the turbine component and a protective shield coupled to an inner surface of the at least one cooling flow passage and extending to an exterior of the turbine component via the aperture. A coating is next deposited on an exterior surface of the turbine component, wherein the protective shield blocks the coating from being deposited in the at least one cooling flow passage. Finally, at least a portion of the protective shield is removed to provide for passage of a cooling fluid flow in the at least one cooling flow passage and wherein the cooling fluid flow exits the turbine component through the aperture.

In yet another embodiment, a turbine component is disclosed. The turbine component includes at least one cooling flow passage having an inner surface and defining a flow path for the passage there through of a cooling fluid flow, a portion of a protective shield on one of the inner surface of the at least one cooling flow passage and an exterior surface of the turbine component in a manner to provide deflection of a cooling fluid flow exiting the aperture and a coating deposited on an exterior surface of the turbine component. The at least one aperture is formed in a surface of the component and in fluid communication with the at least one cooling flow passage. A cooling fluid flow in the at least one cooling flow passage exits the turbine component through the aperture.

Other features and advantages of the present invention will be apparent from the following more detailed description of the preferred embodiment, taken in conjunction with the accompanying drawings which illustrate, by way of example, the principles of the invention. These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Wherever possible, the corresponding reference characters will be used throughout the several views of the drawings to represent the same parts.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In addition, all numerical values identified in the detailed description shall be interpreted as though the precise and approximate values are both expressly identified. When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Provided are a turbine component coating process and a turbine component. Embodiments of the present disclosure, in comparison to articles and methods not using one or more of the features disclosed herein, increase coating deposition efficiency, increase coating effectiveness, increase coating specificity, decreases coating build-up in apertures, decreases post-process hole clearing, or a combination thereof.

Figure 1:
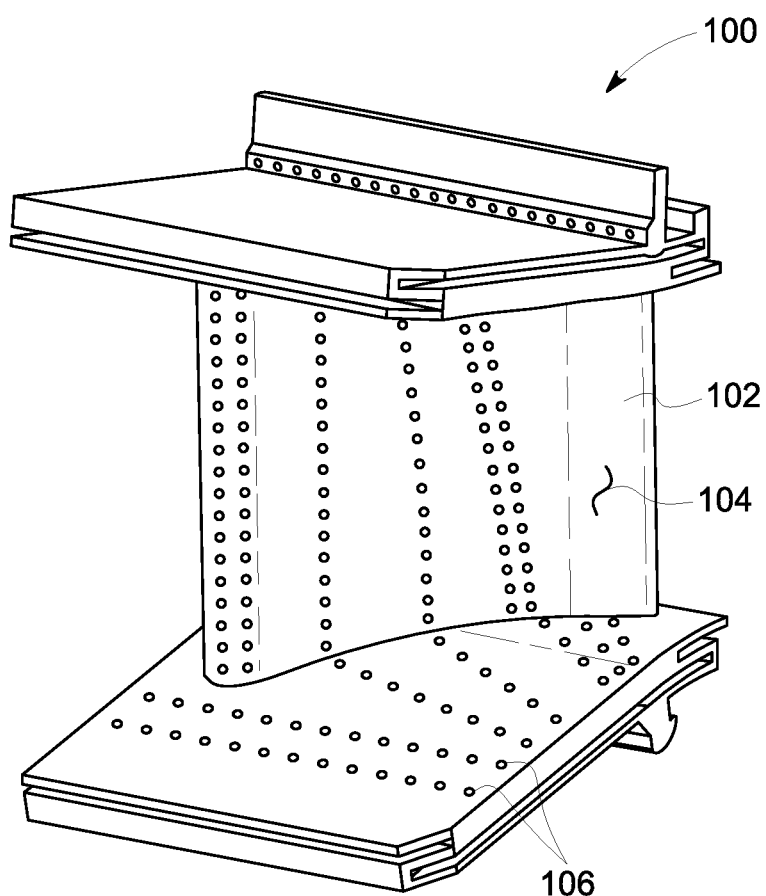
FIG. 1 is a perspective view of a turbine component, in accordance with one or more embodiments presented herein.
Figure 10:
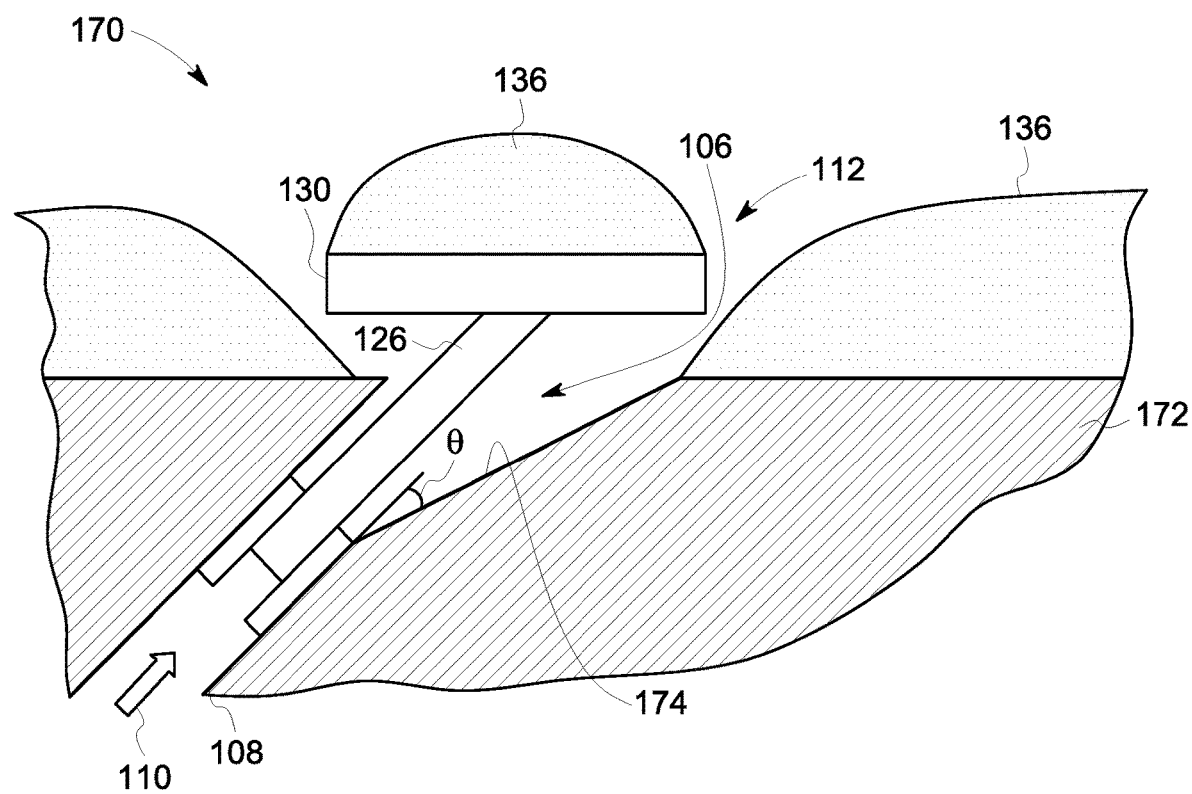
FIG. 10 is a schematic sectional view of another embodiment of a turbine component, including a protective shield, in accordance with one or more embodiments presented herein.

As illustrated in FIG. 1, in one embodiment, a component 100 includes a substrate 102 having a surface 104 with at least one aperture 106 fluidly connected to at least one cooling flow passage (described presently). In some embodiments, when the component 100 comprises a turbine component of a turbine engine, the at least one aperture 106 may comprise a cooling hole and the at least one cooling flow passage may comprise a cooling channel. Each of the cooling flow passages and the at least one aperture 106 may comprise a cross-sectional geometry, wherein the cross-sectional geometry may include a constant cross-sectional geometry, a varied cross-sectional geometry, a diffuser cross-sectional geometry, a cylindrical cross-sectional geometry, a non-cylindrical cross sectional geometry, an oval cross-sectional geometry, a chevron geometry, a converging geometry, a diverging geometry, and/or any other suitable geometry, or combinations thereof. The cooling flow passages and the at least one aperture 106 may further comprise a variety of other variable configurations. For example, the at least one aperture 106 and the cooling flow passages may be formed with centerlines that enter the surface 104 at varying radial angles such as from about 5° to about 175° and axial angles to the surface 104 of from about 5° to about 90°, a variation of which is depicted in FIG. 10. In some embodiments, such centerlines may be at compound angles including both radial and axial angles.

Suitable components 100 for the disclosed embodiments include, for example, blades, buckets, shrouds, nozzles, vanes, transition pieces, liners, combustors, other turbine components having apertures, such as cooling holes, or combinations thereof. The turbine component 100 may be fabricated from high temperature oxidation and corrosion resistant materials, including, for example, nickel-based superalloys, cobalt-based superalloys, gamma prime superalloys, stainless steels, or combinations thereof. In some embodiments, the turbine component, may include a coating (described presently) applied over the surface 104. The coating may be a single layer, more than one layer, or a plurality of layers. Suitable coatings can include, but are not limited to, a bond coat, a thermal barrier coating (TBC), an environmental barrier coating (EBC), or combinations thereof.

Figure 2:
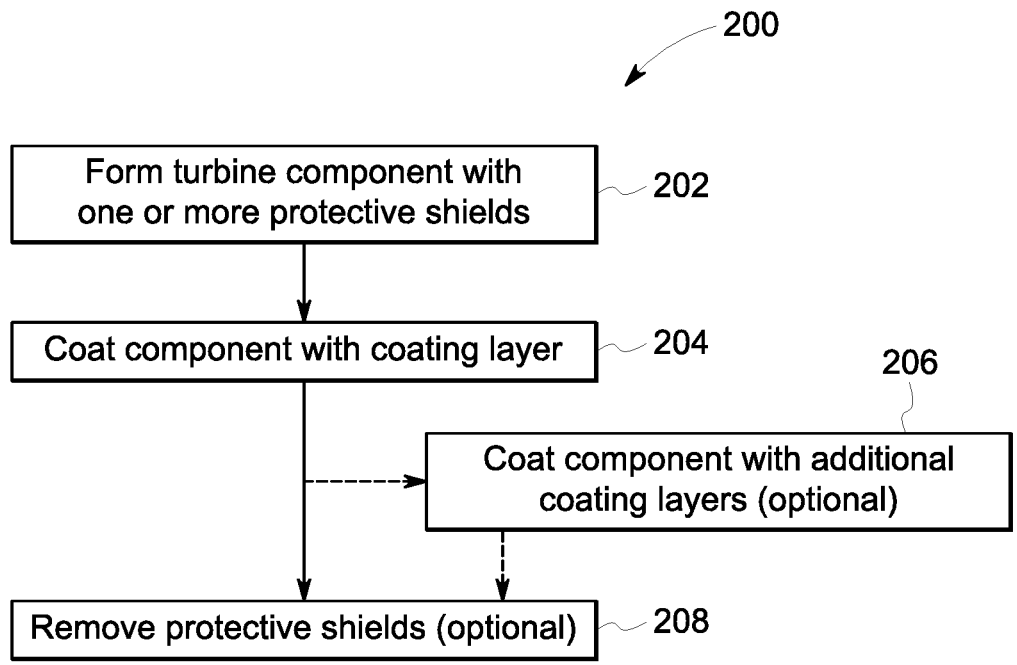
FIG. 2 is a flow diagram of a turbine component coating process, in accordance with one or more embodiment presented herein.

Referring to FIG. 2, a turbine component coating process 200 is illustrated, generally comprising forming the turbine component, such as turbine component 100 (FIG. 1) including one or more protective shields (described presently) disposed proximate one or more apertures, such as apertures 106 (FIG. 1) in a step 202. Each of the one or more protective shields is configured to at least partially cover the at least one aperture 106 to minimize, of not eliminate, deposition of the coating in the at least one aperture 106. The turbine component coating process 200 then generally comprises applying a coating layer, such as a TBC coating layer, in a step 204. The turbine component coating process 200 generally comprises applying a coating (described presently) over the one or more protective shields and on the turbine component surface 104 (FIG. 1) in a step 204. After applying the coating in step 204, a second optional coating may be applied over the previously deposited coating, in an optional step 206. Additional coatings may be applied to form a desired coating composition and/or thickness over the surface 104 of the component 100. Subsequent to deposition of the desired coating composition and/or thickness, a portion of the one or more protective shields may then optionally be removed in step 208.

Specifically, the combination of forming the turbine component 100 to include the one or more protective shields may decrease or eliminate deposition of the coating layer, or layers, in the at least one aperture 106, and thus in at least one cooling flow passage, while further facilitating a less labor intensive coating process. Embodiments of the individual turbine component, coating process steps, protective shields and coating materials will now be discussed in more detail.

Referring now to FIGS. 3-7, illustrated are embodiments of a turbine component 120, generally similar to component 100 of FIG. 1. As discussed above, the turbine component 120 can comprise, for example, blades, buckets, shrouds, nozzles, vanes, transition pieces, liners, combustors, other components having apertures, such as cooling holes, or combinations thereof. In this particular embodiment, the turbine component 120 is a turbine blade 122, sometimes referred to as an airfoil. Of particular interest in FIGS. 3-7 is a trailing edge 124 of the turbine blade 122. As illustrated, the turbine blade 122 includes at least one aperture 106 in flow communication with a cooling flow passage 108 and a cooling fluid flow 110. The at least one aperture 106 (e.g., cooling hole) can comprise a variety of configurations. For example, the at least one aperture 106 may comprise a cross-sectional geometry, wherein the cross-sectional geometry may include a constant cross-sectional geometry, a varied cross-sectional geometry, a diffuser cross-sectional geometry (as illustrated in FIG. 10), a circular cross-sectional geometry, an oval cross-sectional geometry, a chevron geometry, a converging geometry, a diverging geometry, and/or any other suitable geometry, or combinations thereof. In this particular embodiment, the at least one aperture 106 is configured as an ejection hole.

In an embodiment, during the initial turbine component 120 build and the inclusion of the at least one aperture 106 and the at least one cooling flow passage 108, at least one protective shield 112 may be formed integral therewith. Alternatively, the at least one protective shield 112 may be disposed proximate to the at least one aperture 106 and at least one cooling flow passage 108 subsequent to fabrication of the turbine component 120.

In this particular embodiment, the turbine component 120 is formed by well-known additive manufacturing techniques. At the time of fabrication, the at least one protective shield 112 is formed in a manner to provide shielding of the at least one cooling flow passage 108 during coating deposition. The at least one protective shield 112 is generally comprised of one or more connecting spars 126, a stem 128 and a cap 130. In an embodiment, the one or more connecting spars 126, the stem 128 and the cap 130 may be integrally formed. In an alternate embodiment, one or more connecting spars 126, the stem 128 and the cap 130 may be formed as individual components. The at least one protective shield 112, and more particularly, the one or more connecting spars 126 may be coupled thereto an inner surface 132 of a bore 134 that defines each of the at least one cooling flow passage 108.

The at least one protective shield 112 may be configured relative to the turbine component 120, or positioned relative to the turbine component 120, in any manner to at least partially cover the at least one aperture 106. For example, the at least one protective shield 112 may be formed slightly below level with, level with, substantially level with, or form a protrusion extending above the at least one aperture 106. In one embodiment, the at least one protective shield 112, and more particularly, the cap 130 of the at least one protective shield 112, is configured in such a manner to cover a portion of the turbine component surface 104 that comprises the at least one aperture 106. For example, the at least one protective shield 112 may be configured to extend over a broad surface area.

Figure 3:
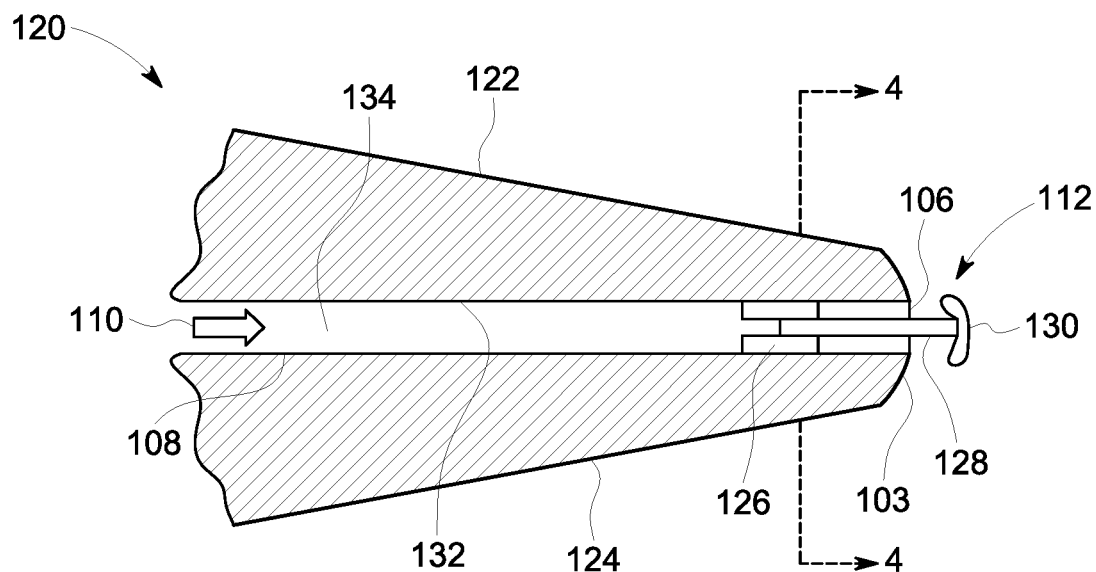
FIG. 3 is a schematic sectional view of a turbine component, and more particularly a trailing edge of a turbine blade, including a protective shield, in accordance with one or more embodiments presented herein.
Figure 4:
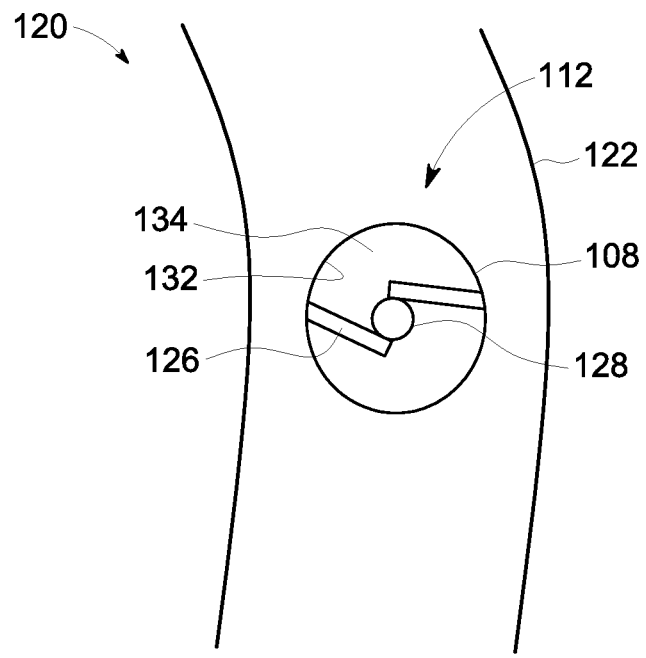
FIG. 4 is a schematic sectional view of the turbine component of FIG. 3, taken through line 4-4, including the protective shield, in accordance with one or more embodiments presented herein.
Figure 5:
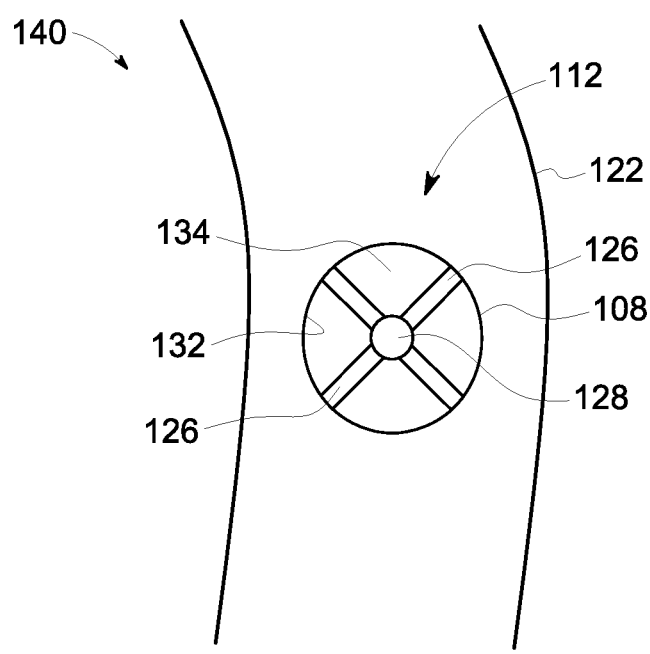
FIG. 5 is a schematic view of another embodiment of a turbine component, including a protective shield, in accordance with one or more embodiments presented herein.

Referring more specifically to FIG. 4, illustrated is a portion of the turbine component 120 and at least one protective shield 112 of FIG. 3, taken through line 4-4 of FIG. 3. In this embodiment, the at least one protective shield 112 includes two connecting spars 126 on the inner surface 132 of the bore 134 that defines the at least one cooling flow passage 108. FIG. 5 illustrates an alternate embodiment of a turbine component 140 in which the at least one protective shield 112 includes four connecting spars 126 on the inner surface 132 of the bore 134 that defines the at least one cooling flow passage 108. It is anticipated that any number of connecting spars 126 may be formed to couple the at least one protective shield 112 to the inner surface 132 of the bore 134, and more particularly the cooling flow passage 108, and that FIGS. 4 and 5 are not meant to be limiting. In an embodiment, the one or more connecting spars 126 may be straight, or curved. In an embodiment, the one or more connecting spars 126 may form turbulating features that enhance heat transfer when the stem 128 is broken off and one or more of the connecting spars 126 remain in the bore 134. In an embodiment, the one or more connecting spars 126 may be configured to provide one or more rectangular-shaped turbulators or spiral-shaped turbulators. In addition, it is anticipated that the one or more connecting spars 126 may be formed relative to the inner surface 132 of the bore 134 at high angles and/or notched to facilitate breaking of the stem 128 from the one or more connecting spars 126.

Figure 6:
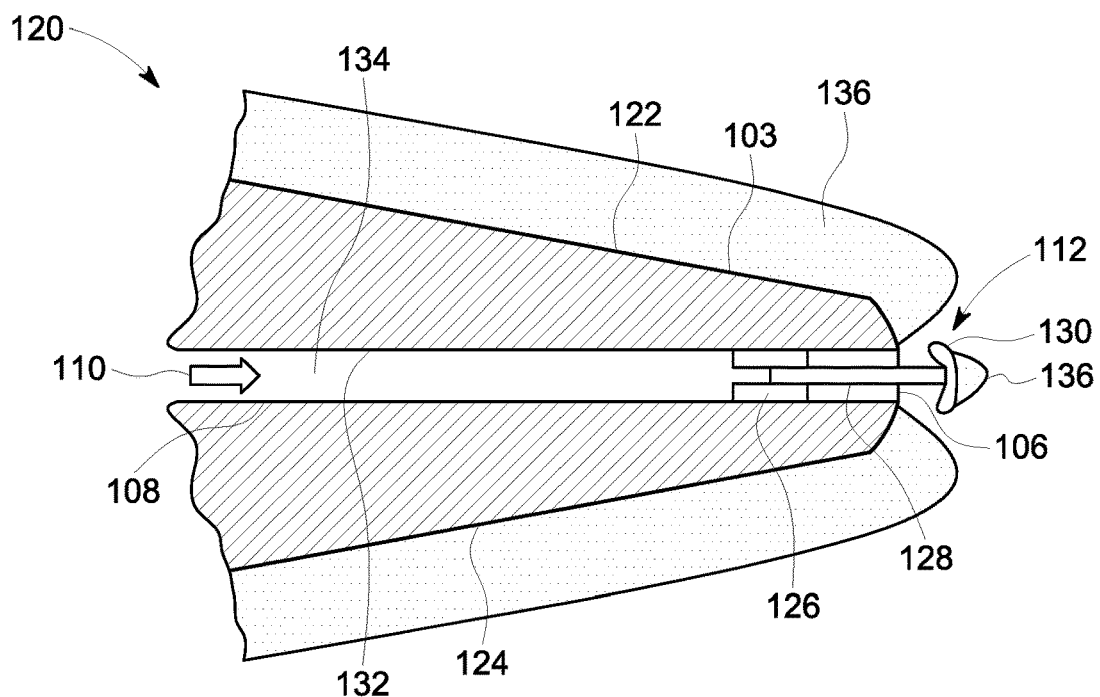
FIG. 6 is a schematic sectional view of another embodiment of a turbine component, and more particularly a trailing edge of a turbine blade, including a protective shield, in accordance with one or more embodiments presented herein.
Figure 7:
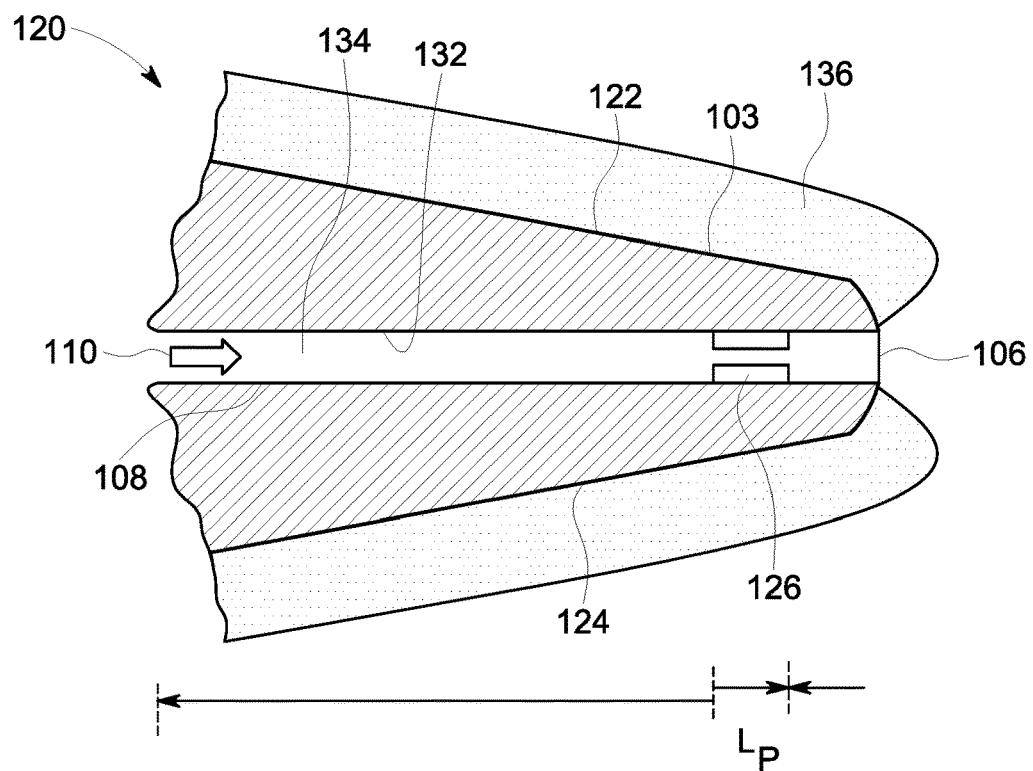
FIG. 7 is a schematic sectional view of the turbine component of FIG. 6, illustrating a portion of the protective shield removed subsequent to coating deposition, in accordance with one or more embodiments presented herein.

Referring now to FIGS. 6 and 7, illustrated is the turbine component 120 of FIGS. 3 and 4 subsequent to deposition of a coating layer 136. As illustrated in FIG. 6, the coating layer 136 is deposited in such a manner that the at least one protective shield 112 minimizes, if not eliminates, the deposition of the coating layer 136 within the at least one cooling flow passage 108, via the at least one aperture 106. In an embodiment, the coating layer 136 can comprise any suitable coating and any suitable application method that facilitates adhesion (e.g., chemical/mechanical bonding or the like) on the surface 104 of the turbine component 120. For example, in some embodiments, the coating layer 136 may comprise a thermal spray coating, an oxidation protection coating, a metallic coating, a bond coating, an overlay coating, or any other type of coating such as those that may be used for a bond coat, thermal barrier coating (TBC), environmental barrier coating (EBC), or combinations thereof. In some exemplary embodiments, the coating layer 136 comprises the bond coat applied by the HVOF spray application method. Such embodiments may be particularly suitable for when an additional coating (not shown) is scheduled to comprise bond coat or TBC applied by the APS application method. For example, in some particular embodiments, a first coating may comprise bond coat applied by HVOF, a second coating may comprise bond coat applied by APS, and a third coating may comprise TBC (e.g., DVC TBC) applied by APS.

In some particular embodiments, the coating layer 136 may be applied through any kinetic energy process (e.g., HVOF). In other embodiments, the coating layer 136 may be applied through any other suitable process such as thermal spray, air plasma spray (APS), high velocity air fuel spraying (HVAF), vacuum plasma spray (VPS), electron-beam physical vapor deposition (EBPVD), chemical vapor deposition (CVD), ion plasma deposition (IPD), combustion spraying with powder or rod, cold spray, sol gel, electrophoretic deposition, tape casting, polymer derived ceramic coating, slurry coating, dip-application, vacuum-coating application, curtain-coating application, brush-application, roll-coat application, agglomeration and sintering followed by spray drying, or a combination thereof.

Still referring to FIGS. 6 and 7, an additional coating layer applied subsequent to the application of the coating layer 136 can comprise any suitable coating and any suitable application method that facilitates adhesion (e.g., chemical/mechanical bonding or the like) onto the coating layer 136 that was previously applied onto the surface 104 of the turbine component 120. For example, in some embodiments, the additional coating layer may comprise a thermal spray coating, an oxidation protection coating, a metallic coating, a bond coating, an overlay coating, or any other type of coating such as those that may be used for a bond coat, thermal barrier coating (TBC), environmental barrier coating (EBC), or combinations thereof. In some exemplary embodiments, the second coating 207 comprises the bond coat and/or thermal barrier coating applied by the APS application method. Such embodiments may be particularly suitable for when the coating layer 136 comprises bond coat applied by the HVOF spray application method.

Any additional coating layers may be applied by any suitable application method. Suitable application methods include, but are not limited to, thermal spray, air plasma spray (APS), high velocity oxygen fuel (HVOF) thermal spray, high velocity air fuel spraying (HVAF), vacuum plasma spray (VPS), electron-beam physical vapor deposition (EBPVD), chemical vapor deposition (CVD), ion plasma deposition (IPD), combustion spraying with powder or rod, cold spray, sol gel, electrophoretic deposition, tape casting, polymer derived ceramic coating, slurry coating, dip-application, vacuum-coating application, curtain-coating application, brush-application, roll-coat application, agglomeration and sintering followed by spray drying, or combinations thereof. In one example, an additional coating layer includes the bond coat and/or thermal barrier coating applied by the APS as discussed above.

In the embodiment of FIG. 7, a portion of the at least one protective shield 112 is removed from the turbine component 120, subsequent to the applying of the coating layer 136, and any additional coating layers. More particularly, in an embodiment, the stem 128 is broken so as to remove the stem 128 and the cap 130 from the turbine component 120 without additional machining operations. In an alternate embodiment, the stem 128 can be removed by a heating operation such that the stem 128 melts in a manner to uncouple from the one or more connecting spars 126. In some embodiments, the stem 128 and the cap 130 can be removed by robotic manipulation, manual clearing, or combinations thereof.

Such removal of the stem 128 and the cap 130 leave the at least one aperture 106 and the cooling flow passage 108 open and clear of the coating layer 136, and any additional optional coating layers that may have been applied. Additionally, removal of the stem 128 and the cap 130 may re-expose a portion of the surface 104 of the turbine component 120 near the at least one aperture 106.

As previously indicated, the one or more connecting spars 126 remain on the inner surface 132 of the bore 134 subsequent to removal of the stem 128 and the cap 130 to promote heat transfer or act as turbulators. In an embodiment, the one or more connecting spars 126 are sized so as to provide for a desired flow therethrough of the cooling fluid flow 110. In addition, the one or more connecting spars 126 are sized to extend a length "$L_P$" of the at least one cooling flow passage 108, wherein "$L_P$" is a portion of a complete or total length "$L_T$" of the at least one cooling flow passage 108.

Figure 8:
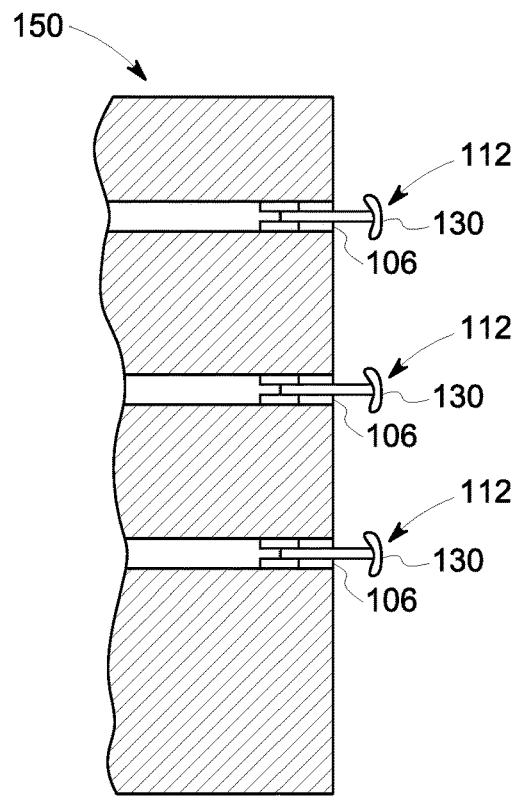
FIG. 8 is a schematic sectional view of a turbine component, including a plurality of protective shields, in accordance with one or more embodiments presented herein.
Figure 9:
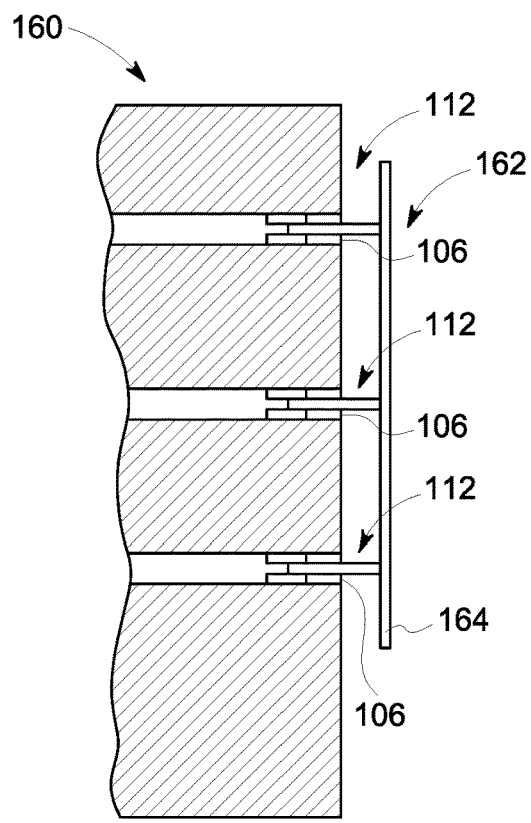
FIG. 9 is a schematic sectional view of another embodiment of a turbine component, including a plurality of protective shields, in accordance with one or more embodiments presented herein.

Referring now to FIGS. 8 and 9, illustrated are alternate embodiments of a portion of a turbine component 150, 160, respectively, similar to turbine component 100 and 120, as previously described in which the a plurality of protective shields 112 may be configured as individual elements (as best illustrated in FIG. 8) having individually formed caps 130 or as a combined structure 162 having a continuous cap 164 (FIG. 9) connecting an entire section of protective shields 112, and thus apertures 106 together which may then be removed as a single element.

Referring now to FIG. 10, illustrated is a turbine component 170, generally similar to turbine component 100 of FIG. 1. The turbine component 170 includes a body 172 having formed therein at least one aperture 106 each in flow communication with the at least one cooling flow passage 108. In this particular embodiment, the at least one aperture 106 may comprise a diffuser configuration wherein a side wall 174 extends away from a cooling fluid flow 110 at a diffuser angle θ. In such embodiments, θ may be greater than 0° such as at least 5°, at least 10°, at least 20°, or even at least 30°. As illustrated in FIG. 10, at least one protective shield 112 (of which only one is illustrated) is disposed in generally a similar manner to any of the previously described embodiments of FIGS. 2-9. The at least one protective shield 112 includes a resulting shape that more closely matches the contour of the diffuser shape, producing improved performance.

Figure 11:
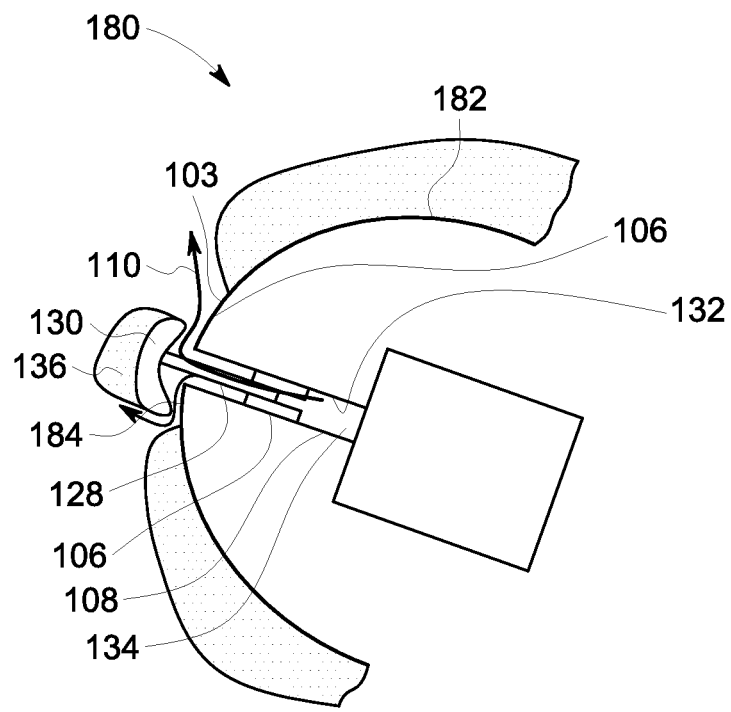
FIG. 11 is a schematic sectional view of another embodiment of a turbine component, including a protective shield, in accordance with one or more embodiments presented herein.
Figure 12:
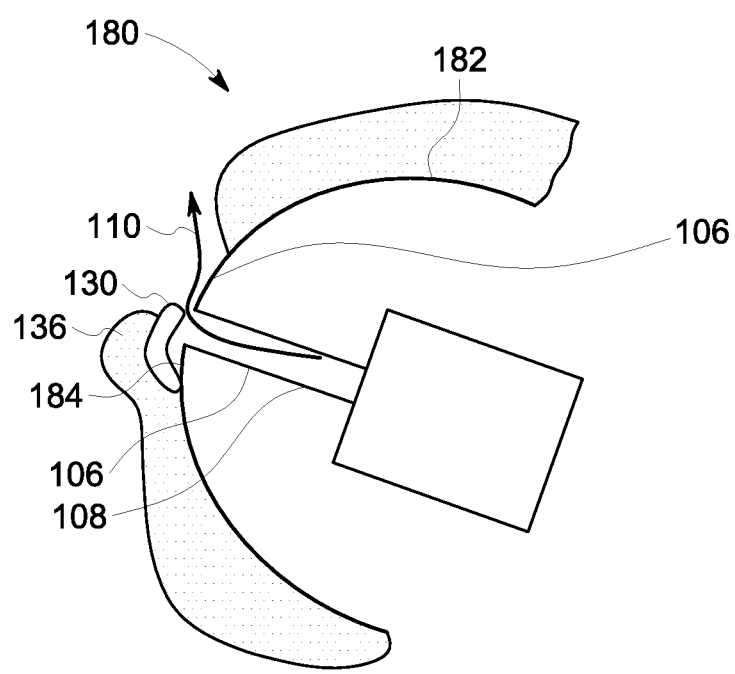
FIG. 12 is a schematic sectional view of the turbine component of FIG. 11, illustrating a portion of the protective shield removed subsequent to coating deposition, in accordance with one or more embodiments presented herein.

Referring now to FIGS. 10 and 11, illustrated are embodiments of a turbine component 180, generally similar to component 100 of FIG. 1. As discussed above, the turbine component 180 can comprise, for example, blades, buckets, shrouds, nozzles, vanes, transition pieces, liners, combustors, other turbine components having apertures, such as cooling holes, or combinations thereof. In this particular embodiment, component 180 is a turbine blade 182, and of particular interest is a leading edge 184 of the turbine blade 182. As illustrated, the turbine blade 182 includes at least one aperture 106 in flow communication with at least one cooling flow passage 108 and a cooling fluid flow 110. Similar to the previously disclosed embodiments, the at least one aperture 106 (e.g., cooling hole) can comprise a variety of configurations, as previously described, and/or any other suitable geometry, or combinations thereof. In this particular embodiment, the at least one aperture 106 is configured as an ejection hole.

Similar to the previous embodiment, during the initial turbine component 180 build and the inclusion of the at least one aperture 106 and at least one cooling flow passage 108, at least one protective shield 112 may be formed integral therewith, and on an inner surface 132 of a bore 134 that defines the cooling flow passage 108. Alternatively, the at least one protective shield 112 may be disposed proximate to the at least one aperture 106 and the at least one cooling flow passage 108 subsequent to fabrication of the turbine component 120.

In this particular embodiment, the turbine component 180 is formed by well-known additive manufacturing techniques. At the time of fabrication, the at least one protective shield 112 is formed in a manner to provide shielding of the at least one cooling flow passage 108 during coating deposition. The at least one protective shield 112 is generally comprised of one or more connecting spars 126, a stem 128 and a cap 130. In an embodiment, the one or more connecting spars 126, the stem 128 and the cap 130 may be integrally formed. In an alternate embodiment, one or more of the connecting spars 126, the stem 128 and the cap 130 may be formed as individual components. The at least one protective shield 112, and more particularly, the one or more connecting spars 126 may be coupled thereto an inner surface 132 of a bore 134 that defines the at least one cooling flow passage 108.

In the embodiment of FIGS. 10 and 11, the turbine component 180 is formed by well-known additive manufacturing techniques. At the time of fabrication, the at least one protective shield 112 is formed in a manner to provide shielding of the at least one cooling flow passage 108 during coating deposition.

The at least one protective shield 112 may be configured relative to the turbine component 180, or positioned relative to the turbine component 120, in any manner to at least partially cover the at least one aperture 106 as illustrated in FIG. 10. For example, the at least one protective shield 112 may be formed slightly below level with, level with, substantially level with, or form a protrusion extending above the at least one aperture 106. The at least one protective shield 112, and more particularly, the cap 130 is configured in such a manner to cover a portion of the turbine component surface 104 that comprises the at least one aperture 106. The at least one protective shield 112 minimizes, if not eliminates, the deposition of a coating layer 136, as previously described, within the at least one cooling flow passage 108 via the at least one aperture 106.

In contrast to the previous embodiment, in this particular embodiment, a portion of the at least one protective shield 112, and more particularly the cap 130 may be left in place rather than removed post-coating. The leading edge 184 of the turbine blade 182 in particular may benefit from such an arrangement, as depicted in FIG. 10. As illustrated, by leaving the cap 130 positioned as shown, the cooling fluid flow 110 is deflected by the at least one protective shield 112, and more particularly, the cap 130, during operation of the engine. Due to packaging constraints in the leading edge 184 it is often difficult to achieve desirable surface angles and the resulting holes are frequently oriented radially. The at least one protective shield 112 would allow the cooling fluid flow 110 to be deflected axially, for greatly improved performance. The impingement of the cooling fluid flow 110 onto the at least one protective shield 112, and in particular the cap 130, provides protection of the cap 130 from high temperatures.

Accordingly, disclosed is a protective shield for improved coating of a turbine component. The protective shield is disposed at least partially within a flow passage of a turbine component during additive manufacturing of the turbine component. The protective shield minimizes, if not eliminates, the deposition of the coating within the flow passage during subsequent coating deposition steps. The protective shields may be designed for removal subsequent to coating. Alternatively, at least a portion of the protective shield may be left in place and provide enhanced cooling to the component. The protective shield provides a reduction in cost through the elimination of post-coat machining operations and/or pre-coat hole protection operations. The protective shield enables improved cooling performance through enhanced cooling in the cooling hole bore/flow passage.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention is intended to cover various modifications and equivalent arrangements included within the spirit and scope of the appended claims.

What is claimed is:

1. A method of depositing a coating on a component of a turbine engine, comprising:
   forming a turbine component including at least one cooling flow passage in fluid communication with an aperture on a surface of the turbine component;
   forming a protective shield on an inner surface of the at least one cooling flow passage and extending to an exterior of the turbine component via the aperture, the protective shield including one or more connecting spars directly contacting the inner surface of the at least one cooling flow passage, a stem extending from the one or more connecting spars, and a cap extending from a distal end of the stem from the one or more connecting spars such that the cap is disposed beyond the surface of the turbine component and over the aperture;
   depositing the coating on an exterior surface of the turbine component, wherein the protective shield is configured to block the coating from being deposited in the at least one cooling flow passage via the aperture; and
   removing at least a portion of the protective shield to provide for passage of a cooling fluid flow in the at least one cooling flow passage and wherein the cooling fluid flow exits the turbine component through the aperture.

2. The method of claim 1, wherein the protective shield is integrally formed with the inner surface of the at least one cooling flow passage via an additive manufacturing process.

3. The method of claim 1, wherein the turbine component and the protective shield are separately formed and wherein the protective shield is subsequently disposed within the at least one cooling flow passage.

4. The method of claim 1, wherein forming the protective shield includes forming the one or more connecting spars integral with the inner surface of the at least one cooling flow passage.

5. The method of claim 1, wherein forming the protective shield includes forming the one or more connecting spars coupled to the inner surface of the at least one cooling flow passage.

6. The method of claim 1, wherein removing at least the portion of the protective shield includes removing the stem and the cap from the turbine component, and wherein the at least one connecting spar remains on the inner surface of the cooling flow passage.

7. The method of claim 1, wherein removing at least the portion of the protective shield includes removing the stem and the at least one connecting spar, and wherein the cap remains and provides deflection of the cooling fluid flow exiting the aperture.

8. The method of claim 1, wherein depositing the coating on the exterior surface of the turbine component includes depositing one or more of a bond coat, a thermal barrier coating (TBC), and an environmental barrier coating (EBC).

9. The method of claim 1, wherein forming the turbine component includes forming one of a blade, a bucket, a shroud, a nozzles, a vane, a transition piece, a liner, a combustor, or any other component having the at least one aperture in fluid communication with the flow passage.

10. A method of depositing a coating on a component of a turbine engine, comprising:
forming via an additive manufacturing process a turbine component including at least one cooling flow passage in fluid communication with an aperture on a surface of the turbine component and a protective shield coupled to an inner surface of the at least one cooling flow passage and extending to an exterior of the turbine component via the aperture, the protective shield including one or more connecting spars, a stem, and a cap;
depositing the coating on an exterior surface of the turbine component, wherein the protective shield blocks the coating from being deposited in the at least one cooling flow passage; and
removing at least a portion of the protective shield to provide for passage of a cooling fluid flow in the at least one cooling flow passage and wherein the cooling fluid flow exits the turbine component through the aperture,
wherein removing at least the portion of the protective shield includes:
removing the stem and the cap from the turbine component such that at least one connecting spar remains on the inner surface of the cooling flow passage; or
removing the stem and the at least one connecting spar such that the cap remains and provides deflection of the cooling fluid flow exiting the aperture.

11. The method of claim 10, wherein forming the protective shield includes forming the one or more connecting spars coupled to the inner surface of the at least one cooling flow passage.

12. The method of claim 10, wherein forming the protective shield includes forming the one or more connecting spars integral with the inner surface of the at least one cooling flow passage.

13. The method of claim 10, wherein depositing the coating on the exterior surface of the turbine component includes depositing one or more of a bond coat, a thermal barrier coating (TBC), and an environmental barrier coating (EBC).

14. The method of claim 10, wherein forming the turbine component includes forming one of a blade, a bucket, a shroud, a nozzles, a vane, a transition piece, a liner, a combustor, or any other component having the at least one aperture in fluid communication with the flow passage.

* * * * *